United States Patent [19]

Johnson

[11] Patent Number: 4,556,125
[45] Date of Patent: Dec. 3, 1985

[54] METHOD OF INSTALLING A PIVOTAL LADDER TO A VEHICLE

[76] Inventor: Roy J. Johnson, P.O. Box 332, Barons, Alberta, Canada, T0L 0G0

[21] Appl. No.: 584,317

[22] Filed: Feb. 28, 1984

[51] Int. Cl.$^4$ .............................................. B60R 3/02
[52] U.S. Cl. ....................................... 182/91; 280/166
[58] Field of Search ...................... 182/91, 97; 280/166

[56] References Cited

U.S. PATENT DOCUMENTS

| | | | |
|---|---|---|---|
| 368,896 | 8/1887 | Nicholas | 182/91 |
| 2,037,805 | 4/1936 | Lindstedt | 182/97 |
| 3,826,337 | 7/1974 | Liptak | 182/91 |
| 4,191,388 | 3/1980 | Barksdale | 182/91 |

Primary Examiner—Reinaldo P. Machado

[57] ABSTRACT

A method of installing a pivotal ladder for a vehicle having a frame with a pair of spaced apart arms joined at one end to a cross member and adapted to be pivotally fastened at an opposite end to a vehicle floor. The ladder is pivotal from a position juxtaposed to an end of vehicle seat below a top surface thereof in which a suspended section of the ladder hangs down from the vehicle floor at the door opening.

3 Claims, 1 Drawing Figure

METHOD OF INSTALLING A PIVOTAL LADDER TO A VEHICLE

BACKGROUND OF THE INVENTION

The present invention relates to a method of installing a pivotal ladder for use in climbing in and out of vehicles whose floor is raised relatively high above ground level.

The proliferation of recreational vehicles, trucks, and other similar vehicles whose floor's are raised well above ground level so as to provide adequate clearance for use over rough roads has created a need for a convenient way to enter such vehicles.

To retain the desired road clearance, any step or ladder that were used would have to be capable of being raised substantially up to the vehicle floor level. Any ladder or step that was attached to the outside of the vehicle would interfere with the opening of the door unless it were affixed below the door in which case it would interfere with the vehicle's road clearance or present a surface that could hook onto branches or rocks in travelling through bush or country roads. Obviously, the use of a stored step or ladder would be highly inconvenient.

SUMMARY OF THE INVENTION

According to the invention there is provided a method of installing a pivotal ladder for a vehicle pivotal from an extended position in which the ladder hangs down from a vehicle doorway to a retracted position in which the ladder is pivotal to a location inside the vehicle doorway, including fabricating the ladder so that its length is slightly shorter than the height of a seat of the vehicle. The ladder is mounted to a floor of the vehicle adjacent the seat between the seat and the vehicle doorway such that in its retracted position the ladder is juxtaposed to a side of the seat with its distal end below a top surface of the seat. The location of the ladder is such that an occupant of the vehicle can exit from the doorway without interference with the ladder when it is in its retracted position.

Preferably the ladder has a bumper pad affixed thereto to hold it away from a body of the vehicle when in its extended position. Advantageously, the ladder is journalled to hinge plates affixed to the vehicle floor.

Preferably, the frame has rounded end portions bent into axial alignment along a line substantially parallel to the cross member for journalling into respective hinge plates affixed to the vehicle floor. The bumper pad may be an elongated member mounted across the suspended sections and positioned so as to contact an edge face of the vehicle floor at the door opening.

By utilizing a pivotal attachment for the ladder one avoids the complication and expense of telescoping attachments or folding ladders. The method of pivotal attachment such that in the stored position the ladder is juxtaposed next to the end of the seat puts the ladder out of the way in the event a user wishes not to use the ladder.

BRIEF DESCRIPTION OF THE DRAWINGS

In drawings of a preferred embodiment of the device.

DETAIL DESCRIPTION WITH REFERENCE TO THE DRAWINGS

Figure 1:
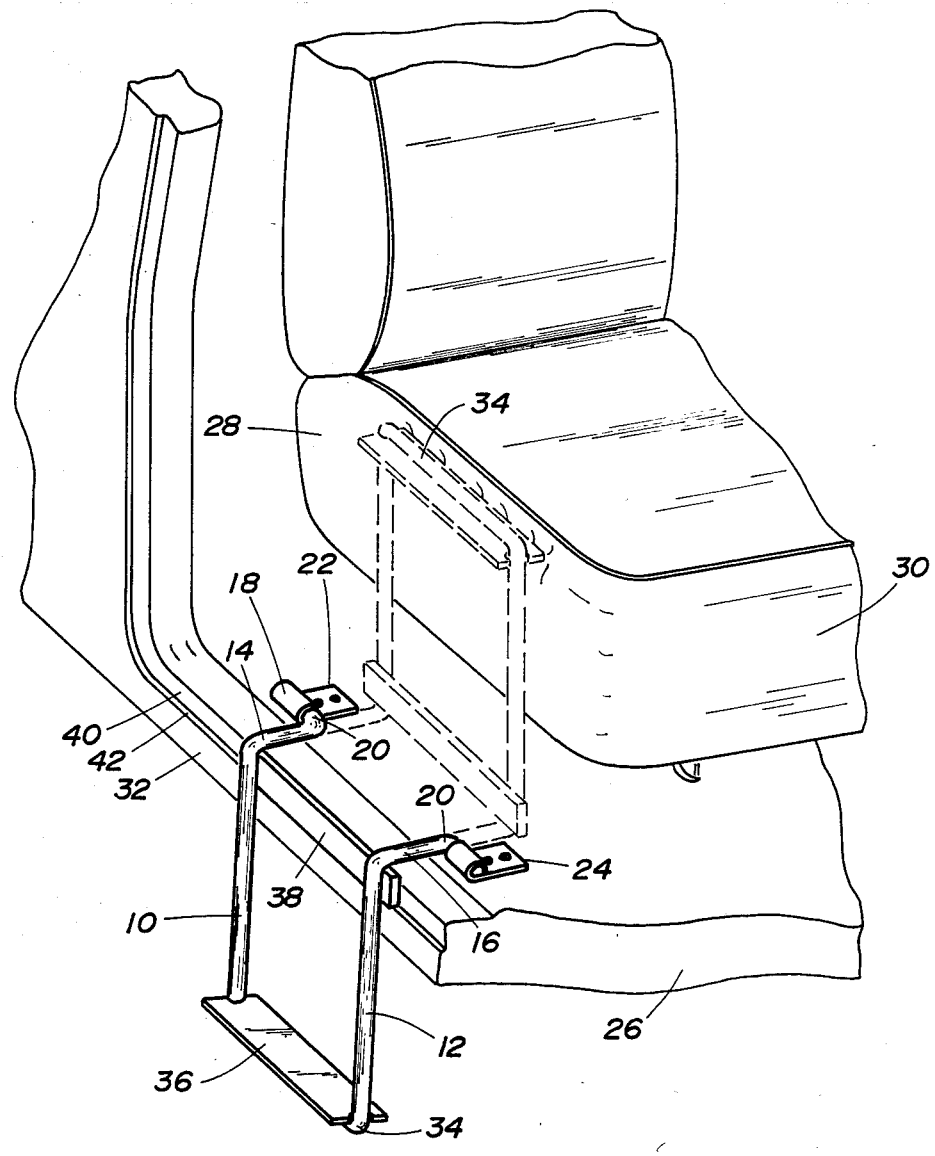
FIG. 1 is a perspective view of the ladder shown mounted on a vehicle with the dotted lines illustrating the ladder in its stored position.

The method of installing a pivotal vehicle ladder as shown in FIG. 1 includes first fabricating the ladder so that its length is slightly shorter than the height of a vehicle seat. The ladder is made up of frame of round iron rod bent to form a pair of parallel suspended sections 10 and 12 and an integrally connected pair of parallel cantilevered sections 14 and 16, respectively. The ends of the cantilevered sections 18 and 20 are journalled in corresponding respective hinge plates 22 and 24 affixed to the floor 26 of a vehicle intermediate the end 28 of a vehicle seat 30 and an edge 32 of the vehicle floor 26 at a door opening thereof.

To the ends of the suspended sections 10 and 12 opposite their connection to the respective cantilevered sections 14 and 16 is connected an integral cross member 34 which supports an attached step plate 36. To the back of the suspended sections 10 and 12 is attached a bumper plate 38 proximate the junction of the former sections with their respective connected cantilevered sections 14 and 16, respectively. The bumper plate is positioned to abut the edge face 32 of the vehicle floor 26 and to distribute the force exerted on the edge face 32 over a broad enough area to avoid denting the latter. By positioning and dimensioning the bumper pad 38 to fit within a shelf formed by a vertical face 30 and a horizontal face 42 of the door edge face 32, vertical support may be provided by the shelf 42.

The ladder is normally stored in the position shown in the dotted lines in FIG. 1 juxtaposed to the end 28 of seat 30. Upon entering or leaving the vehicle the vehicle door (not shown) is opened and the ladder pivoted to the position shown in solid lines.

In the stored position cross member 34 is located sufficiently far below the top surface of seat 30 so as not to interfere with the legs of a person existing or entering the vehicle without using the ladder. Moreover, the ladder when pivoted to its stored position does not interfere with the available open space between the door and the end 28 of seat 30.

Other variations, modifications and departures lying within the spirit of the invention and scope as defined by the appended claims will be obvious to those skilled in the art.

I claim:

1. A method of installing a pivotal ladder for a vehicle, pivotal from an extended position in which the ladder hangs down from a vehicle doorway to a retracted position in which the ladder is pivoted to a location inside said vehicle doorway, comprising:
   (a) fabricating the ladder so that its length is shorter than the height of a seat of said vehicle; and p1 (b) mounting the ladder to a floor of a vehicle adjacent said seat between said seat and the vehicle doorway such that in its retracted position the ladder is juxtaposed to a side of said seat with its distal end below a top surface of said seat and such that an occupant of the vehicle can exit from the doorway without interference from the ladder when it is in its retracted position.

2. A method as defined by claim 1, wherein said ladder has a bumper pad affixed thereto to hold it away from a body of said vehicle when in its extended position.

3. A method as defined by claim 1, wherein said ladder is journalled to hinge plates affixed to said vehicle floor.

* * * * *